United States Patent [19]

Minuto

[11] 3,960,804

[45] June 1, 1976

[54] METHOD OF MAKING SILICONE POLYMER WITH FILLERS DISPERSED THEREIN AND USING SAME TO MAKE SILICONE RUBBER

[76] Inventor: Maurice A. Minuto, 15 Hemmingway Drive, Huntington, N.Y. 11746

[22] Filed: Sept. 25, 1974

[21] Appl. No.: 509,275

Related U.S. Application Data

[63] Continuation-in-part of Ser. No. 460,366, April 12, 1974, abandoned.

[52] U.S. Cl. .......................... 260/37 SB; 260/46.5 G
[51] Int. Cl.² ........................................ C08L 83/04
[58] Field of Search ................... 260/46.5 G, 37 SB

[56] References Cited

UNITED STATES PATENTS

| | | | |
|---|---|---|---|
| 3,824,208 | 7/1974 | Link et al. | 260/37 SB |
| 3,839,280 | 10/1974 | Zdaniewski | 260/46.5 G |

*Primary Examiner*—Lewis T. Jacobs

[57] ABSTRACT

A silicone polymer and fillers are mixed in a high-intensity mixer until the fillers are dispersed in the silicone polymer, and the resulting dispersion is then compounded with other compounding ingredients to obtain a silicone rubber having improved physical properties.

9 Claims, No Drawings

METHOD OF MAKING SILICONE POLYMER WITH FILLERS DISPERSED THEREIN AND USING SAME TO MAKE SILICONE RUBBER

RELATED APPLICATIONS

This application is a continuation-in-part of application Ser. No. 460,366 filed Apr. 12, 1974, now abandoned.

BACKGROUND OF THE INVENTION

This invention relates to silicone rubber and it is particularly related to a method of making silicone rubber compounds having improved physical properties. More specifically, the present invention is concerned with and contemplates the preparation of a homogeneous silicone polymer containing fillers dispersed therein, and the utilization of the resulting dispersion for making silicone rubber having the same or increased fillers content, while exhibiting superior physical properties (e.g., tear strength, tensile strength, elongation and hardness), in a more speedy, efficient and economical manner than the methods which have hitherto been known.

THE PRIOR ART

Silicone rubbers and the methods of their manufacture are well known in the art. Silicone rubbers exhibit exceptional mechanical and electrical performance and serviceability under extreme temperature conditions (−100° F. to +600° F.). These characteristics as well as their inertness, nontoxicity, good dielectric properties, and resistance to ozone and weatherability have resulted in their widespread uses in numerous commercial fields such as in the aerospace, automotive, appliance, electrical and other industries.

The methods and equipments which are presently employed for compounding silicone rubber are generally the same as those for natural rubber or synthetic rubbers. Thus, silicone rubbers are compounded in conventional equipments such as a doughmixer, two-roll mill and Banbury mixers. Since these equipments are ordinarily manufactured for natural or synthetic rubber producers, appropriate adjustments and modifications of these equipments are necessary when they are employed for compounding of silicone rubbers.

The conventional method of compounding silicone rubber on a rubber mill is as follows; pure silicone rubber polymer (silicone gum) is first added to a two-roll mill and allowed to band. Fillers (both reinforcing filler and extending filler) are thereafter added evenly across the bank and the mixture is blended thoroughly. The material that falls into the mill pan is scraped and returned to the batch frequently during compounding. Additives may be incorporated into the batch during or after the addition of the fillers, and finally, curing agents are added to complete the preparation of the silicone rubber compound.

The equipments and techniques which are presently employed for compounding silicone rubber have certain drawbacks and limitations, since efficient and practical use of these equipments have imposed a serious limitation on the amount of fillers which can be incorporated into the silicone rubber compound. In order to accomodate higher fillers content during compounding of silicone rubber, continual adjustments in the equipment must be made which is cumbersome, uneconomical and often impractical. Increasing the filler content, particularly the reinforcing filler content, does not only reduce the cost of the silicone rubber, but also results in improvements in some of its desirable physical properties.

As it will hereinafter be explained, the use of conventional prior art methods also requires extended aging of the mixture in order to insure wetting of the fillers. By "wetting" is meant the adsorption of the silicone polymer on the fillers (reinforcing fillers and/or extending fillers).

U.S. Pat. No. 3,824,208 issued recently (July 16, 1974) to Link et al. describes a method of producing "free-flowing" particles (powder) of silicone polymers, as well as other polymers, by mixing the polymer and the fillers in a high-intensity mixer. The polymeric particles are reduced in size in the mixer and the fillers are coated on these particulate matters until a "free-flowing" material is obtained. The underlying objective of Link et al. is the preparation of "free-flowing" particles, or a powder, in which the polymer particles are completely coated with the fillers. Once this has been achieved, the patentees caution against continued mixing of the fillers with the polymer due to the formation of "gloubles or small crumps which is not desired." (Col. 9, ls. 17–29)

DETAILED DESCRIPTION OF THE INVENTION

It has now been unexpectedly discovered that when a silicone polymer (e.g., silicone gum) and fillers are mixed in a high-intensity mixer for a sufficient period of time, the fillers become thoroughly dispersed in the silicone polymer thereby producing a homogeneous mass of silicone polymer having the fillers thoroughly dispersed therein. It has further been discovered that the resulting silicone polymer mass, with the fillers dispersed therein as aforesaid, can be added to a two-roll mill, or charged directly to an extruder. The remaining compounding ingredients such as, for example, additives, curing agents and pigments may be added to the high-intensity mixer during the preparation of the dispersion of the fillers in the silicone gum, or subsequently to the two-roll mill or the extruder. Thus all the ingredients required for the preparation of silicone rubber can be added directly to the high-intensity mixer therefore obviating the necessity for the stepwise addition of these ingredients as required by the prior art techniques.

The homogeneous silicone polymer mass with the fillers dispersed therein are different from the "free-flowing" particles of silicone polymer disclosed in Link et al. in that in the practice of the instant invention the filler particles must be dispersed through a continuous medium of silicone polymer. Therefore in contrast to the nature of the "free-flowing" material described in Link et al. wherein the particles of silicone polymer are completely coated with the fillers, the practice of this invention requires dispersing the fillers into the silicone polymer mass, thereby providing a homogeneous mass of silicone polymer in which the discrete particulate fillers are surrounded by the silicone polymer.

In the preparation of silicone rubber, it has been discovered that unlike the prior art methods in which the fillers are added to the silicone rubber gum directly in a two-roll mill, a doughmixer or a Banbury mixer, the pre-dispersion of the fillers (and the remaining compounding ingredients if desired) into the silicone gum in the high-intensity mixer facilitates more rapid compounding of the silicone rubber and the preparation of silicone rubber compounds having considerably improved physical properties as will hereinafter be described.

Although it is possible to use pure silicone polymers in the practice of this invention, for practical and economical reasons it is generally preferable to employ silicone rubber reinforced gums (base). In general, the silicone polymers which may be used in the practice of this invention are disclosed by Maurice Morton in his book on "Rubber Technology," pages 368–406 (1973), and by Link et al. in their aforementioned patent. These silicone polymers include diorganopolysiloxane wherein the organo groups may be monovalent hydrocarbon, halogenated monovalent hydrocarbon radicals, etc.

The fillers which may be employed in the practice of this invention are the so-called "reinforcing" fillers and the "extending" fillers (also known as "semi-reinforcing" fillers). These fillers are also described in the aforementioned publication and patent, and they include such materials as Cal-O-Sil (fumed silica), silica aerogels and, in some instances, carbon black.

The extending fillers which can be employed in the practice of this invention are also described in the aforementioned publication and patent and they include such materials as Celite (calcined diatomaceous silica), Min-U-Sil (ground quartz), titanium oxide, zinc oxide and iron oxide. The extending fillers are generally added to achieve an optimum balance between cost, physical properties and processability of the silicone rubber compound.

Although the use of a processing aid is not necessary in the practice of this invention, such processing aids, together with additives curing agents and pigments may be employed either in the pre-dispersion step, or during compounding. These are conventional materials with which silicone rubber compounders are well familiar. For detailed description of the various compounding ingredients which are suitable for the practice of this invention reference may be made to the disclosures of the aforementioned publication and patent, which disclosures are incorporated herein by reference.

As mentioned by Maurice Morton, supra, the selection of the compounding ingredients and their relative amounts can be varied depending upon the desired properties of the silicone rubber, and they may be tailored to suit its ultimate intended applications. Accordingly it will be appreciated that the amount of fillers which can be employed in the practice of this invention will vary over a relatively wide range. Thus, the amount of fillers may generally vary from about 10 to about 600 parts per 100 parts of the silicone polymer. However, for practical and economical reasons, the amount of the reinforcing filler may vary from about 10 to about 100 parts of the silicone polymer and the amount of the extending filler may vary from about 15 to about 500 parts per 100 parts of silicone polymer. Naturally, the maximum amount of filler will vary for different silicone polymers, in all cases, however, the maximum amount of the fillers being limited by the amount beyond which it would be difficult to obtain adequate dispersion of the fillers in the mass of silicone polymer.

The particles size of the fillers (reinforcing filler and extending fillers) which are suitable in the practice of this invention are not per se critical. In general the particles size of the fillers may vary over a relatively wide range as described in the prior art such as for example in the aforementioned publication of Morton.

It must also be mentioned that regardless of the type of fillers which have been heretofore be employed in the prior art, these amounts have been limited to no more than 30 to 40 parts of reinforcing filler per 100 parts of silicone gum. Silicone rubber compounds having higher fillers content could be produced with great difficulty, often requiring large amounts of processing aids, with a consequent poor dispersion and inferior physical properties of the resulting silicone rubber. However, by the practice of the invention it is possible to produce silicone rubber compounds having considerably improved properties even when they contain considerably higher fillers content.

As it was previously mentioned, even at the levels of the fillers which have been employed in the prior art techniques, the resulting compound must be aged in order to insure wetting of the fillers by the silicone polymer. In general, the silicone gums or base to which extending fillers have been added must be aged for at least one day in order to wet the fillers before fabrication. Where reinforcing fillers are employed, usually at least three days are required in order to wet the fillers before fabrication.

It has now been also found that in addition to obtaining a dispersion of the fillers in the silicone rubber by the use of a high-intensity mixer, it is also possible to achieve various degrees of wetting of the fillers by the silicones. Thus, by selecting the optimum time and temperature of the pre-dispersion step, the wetting of the fillers by the silicone polymer can be remarkably accelerated thereby obviating the need for extended aging of the silicone polymer-fillers mixture as it has heretofore been required in the prior art. In any event, the time required to achieve a certain degree of wetting in the high-intensity mixer is considerably less than the time required to achieve a comparable degree of wetting by the use of the prior art methods.

The speed of the high-intensity mixer, the temperature of the materials therein and the time required to obtain the substantially complete and uniform dispersion of the fillers in the silicone rubber gum can be varied to achieve various degrees of wetting, and they can be optimized depending upon the type and quantity of the materials which are employed as well as the desired physical properties of the silicone rubber compound. Therefore it will be readily appreciated that, in view of the variety of types of fillers and silicone polymers which can be employed, and the differences in their relative amounts, such conditions will vary over a relatively wide range. In all cases, however, the fillers and the silicone rubber must be mixed in the high-intensity mixer for a minimum critical time until the fillers have been substantially completely dispersed in the silicone polymer. From visual or photomicroscopic examination of the resulting mixture, those skilled in the art can readily ascertain when the fillers have been substantially completely dispersed in the silicone polymer so as to provide a homogeneous mass of silicone polymer with fillers dispersed therein. Once such a dispersion has been obtained, mixing is discontinued and the resulting dispersion can be added to a two-roll mill, or charged directly to an extruder in order to prepare the finished silicone rubber compound.

The high-intensity mixer employed herein may be of the usual type and variety such as for example the Henschel high-intensity mixer. The speed of rotation (rotor tip speed) of the mixer may vary over a relatively wide range depending upon the type and relative amounts of the materials employed. In general it has been found that the rotor tip speed may vary from about 25 to about 250 feet per second, preferably from about 50 to about 160 feet per second satisfactory for most systems, once again, bearing in mind that this speed may be varied somewhat by the skilled operator during the mixing of the fillers with the silicone polymer in order to achieve proper dispersion of the fillers in the silicone polymer.

As it was previously mentioned, it has been further found that in addition to obtaining a uniform dispersion of the fillers in the silicone polymer in the high-intensity mixer, the wetting of the fillers by the silicone polymer may be improved by achieving an optimum temperature. Since the temperature of the materials in the high-intensity mixer rises during the mixing operation due to frictional heat, a maximum temperature is usually attained after a finite time when the desired dispersion has been obtained. While at this temperature, and for most formulations, the fillers are adequately wetted by the silicone polymer, in other formulations, it may be desirable to exceed the temperature attained by frictional heat only. In such instances, the mixer is conveniently heated by conventional external heating means (e.g., steam coils, electrical heating) in order to attain the optimum temperature. Accordingly, it will be appreciated that the optimum temperature will vary depending, to a great extent, on the type of silicone polymer, type of fillers, and the relative amounts of these ingredients. In general, however, this optimum temperature is in the range of about 0° F. to about 350° F., or even somewhat higher.

Adequate wetting of the filler by the silicone rubber is highly desirable from the standpoint of compounding the resulting dispersion and for the preparation of silicone rubber compounds having the desired characteristics.

When such large amounts of fillers are added to silicone gums directly in conventional two-roll mills, in accordance with the prior art methods, the fillers tend to become highly concentrated in some parts of the silicone gum forming hard flakes which are difficult to break up. Accordingly, the mixture is difficult to compound and the resulting rubber will exhibit inferior physical properties. On the other hand, when the filler is dispersed in the silicone gums by the process of this invention, and the resulting dispersion is then added to the mill, the dispersion bands around the rollers quickly and uniformly within few minutes, and the resulting silicone rubber compound exhibits uniform and superior physical properties. If desired, the resulting dispersion from the high-intensity mixer can be readily extruded into a comparable consistency and homogeneity as the milled material prior to compounding, with the same efficacious results.

The following examples will serve to further illustrate the unique method of this invention. However, it must be understood that these examples are not intended to limit this invention, nor the types of ingredients which can be efficaciously employed therein. In the following examples, all parts are on weight bases.

EXAMPLE 1

One hundred parts reinforced silicone gum (dimethylpolysiloxane having added vinyl groups, manufactured under the tradename of Dow Coring Base 437 by the Dow Coring Corporation, Mildland, Mich., Bulletin No. 17–030, January, 1972.) containing approximately 19 weight percent fumed silica was added to a laboratory two-roll mill having 6 × 12 inch rolls and operating at a ratio of 1.25:1, 100° F. and 23 rpm roll speed, without cooling. The silicone gum readily banded around the roll. Thereafter, a mixture of 100 parts Min-U-Sil (ground quartz) having an average particle size of 5 microns, 35 parts Cab-O-Sil (fumed colloidal silica) having an average particle size of 0.02 micron and 0.75 part Varox catalyst (2-5 dimethyl-2, 5-di (t-butyl peroxy) hexane) were added to the two roll mill. The mixture flaked and then turned into a powder. No adequate samples could be obtained for testing purposes.

EXAMPLE 2

Using the same ingredients as in Example 1, and in the same quantities, the silicone gums and the fillers were charged to a one-gallon Henschel high-intensity mixer rotating at a rotor tip speed of 157 feet per second (3800 rpm). After six minutes, the temperature of the material in the mixer rose from room temperature to 140° F. and the fillers had thoroughly dispersed in the silicone gums. The resulting dispersion was passed through a two-inch diameter rubber extruder with a ribbon die and the ribbon thereafter was added to the same two-roll mill which was employed in Example 1, and operated at the same conditions. The mixture readily banded around the rolls and, unlike in the previous example, it did not flake or turn into a powder.

The resulting band from the two-roll mill was molded into a slab at 320° F. for 20 minutes. Five ASTM size die-C dumbells were cut from this slab and tested with the following results:

| Sample No. | Tensile Strength,[1] psi | % Elongation[1] | Shore A Hardness[2] |
|---|---|---|---|
| 1 | 1210 | 95 | 93 |
| 2 | 1195 | 90 | 93 |
| 3 | 1200 | 90 | 94 |
| 4 | 1190 | 90 | 93 |
| 5 | 1215 | 95 | 94 |

[1]ASTM-D-412-68 method was used in this example as well as in the following examples.
[2]ASTM-2240-68 method was used in this examples as well as in the following examples.

EXAMPLE 3

The ingredients employed in this example were the same as in Example 1.

One hundred parts reinforced silicone gum was added to the two-roll mill which was employed in Example 1, and which was operated at the same conditions. The silicone gum readily banded around the roll. Thereafter, 160 parts Min-U-Sil, 10 parts Cab-O-Sil and 0.8 part Varox were added to the two-roll mill and were mixed with the silicone gum. After mixing for 40 minutes, the resulting band was removed and molded into a slab at 320° F. for 20 minutes. Five ASTM size die-C dumbells were cut from this slab and their tensile strengths and elongations were determined as in Example 2. The results are as follows:

Table 2

| Sample No. | Tensile Strength, psi | % Elongation | Shore A Hardness |
|---|---|---|---|
| 1 | 800 | 130 | 71 |
| 2 | 730 | 120 | 72 |
| 3 | 710 | 110 | 74 |
| 4 | 750 | 125 | 73 |

Table 2-continued

| Sample No. | Tensile Strength, psi | % Elongation | Shore A Hardness |
|---|---|---|---|
| 5 | 810 | 135 | 72 |

EXAMPLE 4

Using the same ingredients as in Example 3, and in the same quantities, the entire mixture was charged to the high-intensity mixer employed in Example 2, and were mixed therein at a speed of 3800 rpm. After 5½ minutes the temperature of the material in the mixer rose from room temperature to 110° F. The resulting mixture was then added to the same two-roll mill which was employed in the previous examples (operating at the same conditions) and the material readily banded around the roll in two minutes.

The resulting band from the two-roll mill was molded into a slab at 320° F. for 20 minutes. Five ASTM size die-C dumbells were cut from this slab and the dumbells were tested as in the previous example, with the following results:

Table 3

| Sample No. | Tensile Strength, psi | % Elongation | Shore A Hardness |
|---|---|---|---|
| 1 | 990 | 140 | 72 |
| 2 | 1015 | 155 | 73 |
| 3 | 1010 | 150 | 73 |
| 4 | 1000 | 150 | 72 |
| 5 | 1005 | 150 | 73 |

From the foregoing examples it is readily apparent that the present invention is not only more advantageous when it is desired to increase the amount of fillers, particularly the reinforcing filler, in silicone rubber, but it is also more advantageous at lower levels of fillers content, such as the levels employed in the prior art methods. Even at such lower levels of fillers, the resulting silicone rubber compound can be prepared in a considerably shorter time and without aging of the silicone rubber gum-filler mixture. In all cases, the resulting silicone rubber compound exhibits more consistency, higher tensile strength and higher elongation in comparison with a similar formulation prepared by the prior art techniques.

The silicone rubber compounds which are produced in accordance with the method of this invention are generally useful in the same types of applications as conventional silicone rubbers. Since, however, the silicone rubber compounds which are made in accordance with the method of this invention exhibit more consistency, higher tensile strength, elongation and hardness than the silicone rubbers made by the prior art methods, they are naturally more useful and desirable in applications where these improved properties are significant, such as, for example, in wire coating, molds for casting liquid plastics and die cast metals, for custom jewelry, ornamental articles, hardware, furniture, and a host of other applications.

What is claimed is:

1. A process for producing a homogeneous mass of silicone polymer having filler particles dispersed therein, which process comprises mixing said silicone polymer with said filler at elevated temperatures between about 0°F. and about 350°F., in a high-intensity mixer, said mixing being carried out for a period of time sufficient to disperse said filler particles in said silicone polymer such that said polymer becomes a continuous phase with said filler particles dispersed therethrough as the discontinuous phase.

2. A process as in claim 1 wherein said silicone polymer is an organopolysiloxane.

3. A process as in claim 2 wherein said organopolysiloxane is a hologenated dimethylpolysiloxane.

4. A process for producing a homogeneous mass of silicone polymer having filler particles dispersed therein, which process comprises mixing said silicone polymer with said filler at elevated temperatures between about 0°F. and about 350°F., in a high-intensity mixer, said mixing being carried out for a period of time sufficient to disperse said filler particles in said silicone polymer such that said silicone polymer becomes a continuous phase with said filler particles dispersed therethrough as the discontinuous phase.

5. A process as in claim 4 wherein said silicone polymer is an organopolysiloxane.

6. A process as in claim 5 wherein said organopolysiloxane is a halogenated dimethylpolysiloxane.

7. A process for making silicone rubber compound having improved physical properties which process comprises (a) mixing, in a high-intensity mixer, and at elevated temperatures between about 0°F. and 350°F., a silicone polymer with from about 10 to about 100 parts of a reinforcing filler, and from about 15 to about 500 parts of an extending filler, per part of said silicone polymer, said mixing being carried out for a period of time sufficient to disperse said reinforcing filler and said extending filler in said silicone polymer such that said silicone polymer becomes a continuous phase with said fillers dispersed therethrough as discontinuous particulate matters.

8. A process as in claim 7 wherein said silicone polymer is an organopolysiloxane.

9. A process as in claim 8 wherein said organopolysiloxane is a halogenated dimethylpolysiloxane.

* * * * *